US012591057B2

(12) United States Patent
Siddiq

(10) Patent No.: US 12,591,057 B2
(45) Date of Patent: Mar. 31, 2026

(54) MULTI-DIRECTIONAL TRANSDUCER SYSTEM

(71) Applicant: OXFORD RF SOLUTIONS LTD, London (GB)

(72) Inventor: Kashif Siddiq, London (GB)

(73) Assignee: OXFORD RF SOLUTIONS LTD, London (GB)

( * ) Notice: Subject to any disclaimer, the term of this patent is extended or adjusted under 35 U.S.C. 154(b) by 294 days.

(21) Appl. No.: 18/235,022

(22) Filed: Aug. 17, 2023

(65) Prior Publication Data

US 2023/0393272 A1 Dec. 7, 2023

Related U.S. Application Data

(63) Continuation of application No. PCT/GB2022/050475, filed on Feb. 21, 2022.

(30) Foreign Application Priority Data

Feb. 23, 2021 (GB) .................................... 2102538

(51) Int. Cl.
*G01S 15/89* (2006.01)

(52) U.S. Cl.
CPC ...... *G01S 15/8922* (2013.01); *G01S 15/8925* (2013.01); *G01S 15/8993* (2013.01)

(58) Field of Classification Search
CPC ............. G01S 15/8922; G01S 15/8925; G01S 15/8993; G01S 7/4811; G01S 7/521;
(Continued)

(56) References Cited

U.S. PATENT DOCUMENTS

2012/0212375 A1* 8/2012 Depree, IV ........ H01Q 15/0086
977/762
2022/0173524 A1* 6/2022 Miki ..................... H01Q 21/08

FOREIGN PATENT DOCUMENTS

JP H11225013 A 8/1999
JP 2017034644 A 2/2017
(Continued)

OTHER PUBLICATIONS

PCT International Search Report issued in PCT International Application PCT/GB2022/050475, filed on Feb. 21, 2022, mailed on May 24, 2022.
(Continued)

*Primary Examiner* — Francis C Gray
(74) *Attorney, Agent, or Firm* — Basil M. Angelo; ANGELO IP

(57) ABSTRACT

A transducer for transmitting/receiving wave signals simultaneously from an environment. The transducer comprises a base unit (32) and one or more reflective plates (36) mounted relative to the base unit (32). The base unit (32) carries one or more transducer arrays (30) associated with the or each reflective plate. The reflective plate(s) are mounted relative to the base unit (32) such that it extends at an acute angle relative to a portion of the outer surface of the base unit (32) having a transducer array (30) associated with it. In use, wave signals generated and radiated by the active transducer elements of a transducer array (30) are radiated onto, and reflected outwardly from, a reflective plate associated with it, and wave signals incident on a reflective surface of a said reflective plate are reflected onto the transducer elements (30) of a transducer array.

20 Claims, 6 Drawing Sheets

(58) Field of Classification Search
CPC ...... H01Q 15/14; H01Q 15/18; H01Q 19/104;
H01Q 19/12; H01Q 21/065; H01Q 1/42;
H01Q 19/005; H01Q 19/17
See application file for complete search history.

(56)                    References Cited

FOREIGN PATENT DOCUMENTS

| | | | | | |
|---|---|---|---|---|---|
| JP | 2022527104 | A | * | 5/2022 | ........... G01S 17/931 |
| KR | 101589721 | B1 | * | 1/2016 | ........... H01Q 15/148 |
| WO | 2020189033 | A1 | | 9/2020 | |

OTHER PUBLICATIONS

PCT Written Opinion of the International Search Authority issued in
PCT International Application PCT/GB2022/050475, filed on Feb.
21, 2022, mailed on May 24, 2022.

* cited by examiner

MULTI-DIRECTIONAL TRANSDUCER SYSTEM

CROSS-REFERENCE TO RELATED APPLICATIONS

This application is a continuation of PCT International Application PCT/GB2022/050475, filed on Feb. 21, 2022, which claims the benefit of, or priority to, United Kingdom Patent Application 2102538.2, filed on Feb. 23, 2021, all of which are hereby incorporated by reference in their entirety for all purposes.

FIELD OF THE INVENTION

This invention relates generally to a multi-directional transducer system and, more particularly but not necessarily exclusively, to an improved beamforming and imaging antenna system for high-resolution, omnidirectional imaging and communication systems.

BACKGROUND OF THE INVENTION

References made throughout the following description and claims to an 'antenna' are intended to include any beamforming and/or imaging transducer suitable for use in, for example, radio frequency (RF), optical, sonar, and ultrasonic applications, and the present invention is not necessarily intended to be limited in this regard. Accordingly, the terms 'antenna' and 'transducer' may be used interchangeably herein, without limitation.

Antenna and other transducer systems are well known in various fields of technology, for receiving and transmitting mechanical (pressure) and electromagnetic waves. The configurations of such systems vary greatly, depending on the waves in question and the field of application, as well as the performance metrics to be achieved. Examples of such systems can, for example, be found in the field of millimetre waves that utilises electromagnetic waves of frequency 30-300 GHz in a wide range of applications, including radio astronomy, remote sensing, imaging, security screening, telecommunications, military systems and automotive radar. Many of these, and other types of real-world, systems require effective multi-directional or omnidirectional (360°) operation in near real-time in order to meet the requirements of the application. This functionality can, in theory at least, be attained by scanning, i.e. rotating an antenna about an axis to capture signals from a 360° volume surrounding it. However, in practice, such systems are impractical for many applications, including vehicular monitoring and/or imaging applications (such as automotive radar), as the environment surrounding the antenna changes too quickly to be captured and processed sufficiently quickly and at a sufficiently high resolution. Furthermore, the usage of electromechanical parts like motors and drive assemblies have cost, size, weight and power implications.

Instead, vertically arranged arrays of antenna elements (e.g. patch antenna elements) are used. Referring to FIG. 1 of the drawings, in a conventional omnidirectional antenna system, a plurality of antenna panels 10 is arranged about a vertical axis to form a 'cylindrical' configuration. Each antenna panel, circumferentially spaced from the immediately adjacent panels, 'faces' outward from the cylinder so that, together, the antenna panels simultaneously cover a 360° volume around the vertical axis.

Referring additionally to FIGS. 2 and 3 of the drawings, each antenna panel 10 comprises an elongate receptacle containing RF feed electronic circuitry and cabling. A number of vertically arranged (or 'stacked') active planar antenna elements 12 (e.g. patch antenna elements) are formed on a dielectric substrate or 'microstrip' mounted on an outer surface of the first receptacle. The 'rear' of each substrate is connected to ground through an associated connection. Each antenna element has an RF feed 13, which is fed from a coaxial cable 14 (and associated driver electronics contained within the first receptacle), and the cabling (14) and connectors required to drive each transducer panel 10 extends up through the centre of the 'cylinder' from a second receptacle 16 at the base of the antenna system. The second receptacle 16 contains the RF transceiver and signal generation processing hardware required to process the signals received by the patch antenna elements 12. In use, RF antenna beams 18 are transmitted and/or received by the patch antenna elements 12 and signals generated by received antenna elements 12 are processed by the hardware contained in the second receptacle 16. This arrangement, and its manner of operation, will be well known to a person skilled in the art, and need not be discussed in any further detail herein. As will also be known to the skilled person, the feed circuitry, power amplifiers and low-noise blocks must be positioned near individual patch antenna elements, such that this prior art arrangement requires a set of driver electronics in each of the first receptacles forming a respective panel 10, and cabling for each antenna panel 10 must then run through the centre of the 'cylindrical' assembly to a second receptacle at the base of the assembly, where the processing hardware can be housed. This results in a rather cumbersome arrangement, with each of the multiple first receptacles adding weight, and the cabling creating additional technical complexity and cost. The size, weight, complexity and associated cost of the arrangement make it prohibitive for some applications, such as automotive applications for example. Furthermore, if the mounting height of the antenna is required to be changed, all of the antenna panels 10 and associated cabling must be moved, which presents an additional challenge.

BRIEF SUMMARY OF THE INVENTION

In accordance with a first aspect of the present invention, there is provided a transducer configured to transmit and/or receive wave signals simultaneously from at least a sector of a 360° volume of the environment around an axis, the transducer comprising a base unit and one or more reflector units, the one or more reflector units being mounted relative to the base unit such that an outer surface of said base unit faces the one or more reflector units, the base unit having, in or on said outer surface thereof, one or more transducer arrays associated with the or each reflector unit, the or each transducer array comprising a plurality of active transducer elements, the one or more reflector units comprising, respectively, one or more reflective plates, the or each reflective plate having an outer reflective surface and being mounted relative to the base unit such that the outer reflective surface thereof extends at an acute angle relative to a portion of the outer surface of said base unit having therein or thereon a transducer array associated therewith, such that, in use, wave signals generated and radiated by said active transducer elements of a transducer array are radiated onto, and reflected outwardly from, a reflective surface of a said reflector unit associated therewith, and wave signals incident on a reflective surface of a said reflector unit are reflected thereby onto the transducer elements of a said transducer array associated therewith.

In an exemplary embodiment, each reflective plate may be mounted such that its outer reflective surface extends at substantially 45° to the plane of the respective transducer array associated therewith.

In an exemplary embodiment, each reflective plate may, advantageously, be configured and mounted relative to said base unit so as to, in use, reflect signals incident thereon through substantially 90° from or onto the transducer array associated therewith.

Beneficially, said one or more reflective plates may be substantially planar. Alternatively, said one or more reflective plates may be outwardly concave, which may be beneficial for improving angular resolution of the wave signals.

In one embodiment, the transducer may comprise a pyramidal or truncated pyramidal reflector unit, comprising four reflective plates, each said reflective plate of said reflector unit having a reflective outer wall that extends at an acute angle relative to the outer surface of the base unit, the transducer optionally further comprising, in or on said outer surface of said base unit, a plurality of transducer arrays, each transducer array comprising active transducer elements arranged in sets or blocks and being located adjacent the reflective outer surface of a respective reflective plate of the reflector unit.

Optionally, a transducer may comprise a transducer array located generally centrally on the base unit relative to said reflector unit(s) for receiving and transmitting signals to and from the zenith and adjacent regions of the environment around the transducer.

In some exemplary embodiment, a transducer may comprise a three-dimensional reflector unit mounted relative to, and spaced-apart along said axis from, said base unit, said reflector unit that increases in cross-sectional width or diameter in a direction away from said outer surface of said base unit.

Beneficially, the transducer elements of the or each transducer array may be provided on a planar surface.

In the case of a three-dimensional reflector unit, the outer reflective surface may be provided all of the way around the reflector unit, along at least a portion of its height. Alternatively, the outer reflective surface may be provided around a portion of the reflector unit. In an exemplary embodiment, the lateral cross-section of the reflector unit may be symmetrical, or it may be non-symmetrical. In an embodiment, the reflector unit may comprise a generally conic-section structure, with the smallest diameter end being located nearest said outer surface of said base unit. In an embodiment, the plurality of transducer elements provided on or in said outer surface of said base unit may be arranged in spaced-apart relation and in a configuration corresponding with the cross-sectional shape of said reflector unit. In a specific exemplary embodiment, the reflector unit may be a conic-section structure and the active transducer elements may be arranged in spaced-apart relation and in a plurality of concentric rings, such that each ring of active transducer elements receives wave signals from, or transmit wave signals to, the outer reflective surface of the reflector unit at a different respective height thereon, and a plurality of radial sets of transducer elements is defined. Optionally, said reflector unit may be a conical or truncated conical structure.

Optionally, some of the transducer elements of the transducer array may be active, and other of the transducer elements of the transducer array may be passive.

Beneficially, the transducer elements may comprise planar transducer elements.

In an exemplary embodiment, the transducer may be configured to transmit and receive radio or microwave frequency wave signals, wherein the transducer elements comprise antenna elements configured to transmit and/or receive radio or microwave frequency wave signals, and the reflective outer surface of the reflector unit comprises a conductive material.

The reflective outer surface of said reflector unit may comprise one or more metals or metamaterials.

In an embodiment, the transducer may comprise a protective cover enclosing at least said one or more reflector units and said outer surface of said base unit, said protective cover being formed of a material that is substantially transparent to said wave signals.

Optionally, the outer surface of a reflector unit may be configured to take on a profile, such as linear, quadratic or hyperbolic.

Another aspect of the invention provides a 3D holographic system comprising a transducer substantially as described above.

These and other aspects of the invention will be apparent from the following detailed description.

BRIEF DESCRIPTION OF THE DRAWINGS

Embodiments of the present invention will now be described by way of examples only and with reference to the accompanying drawings, in which.

DETAILED DESCRIPTION OF THE INVENTION

Figures 1, 2:
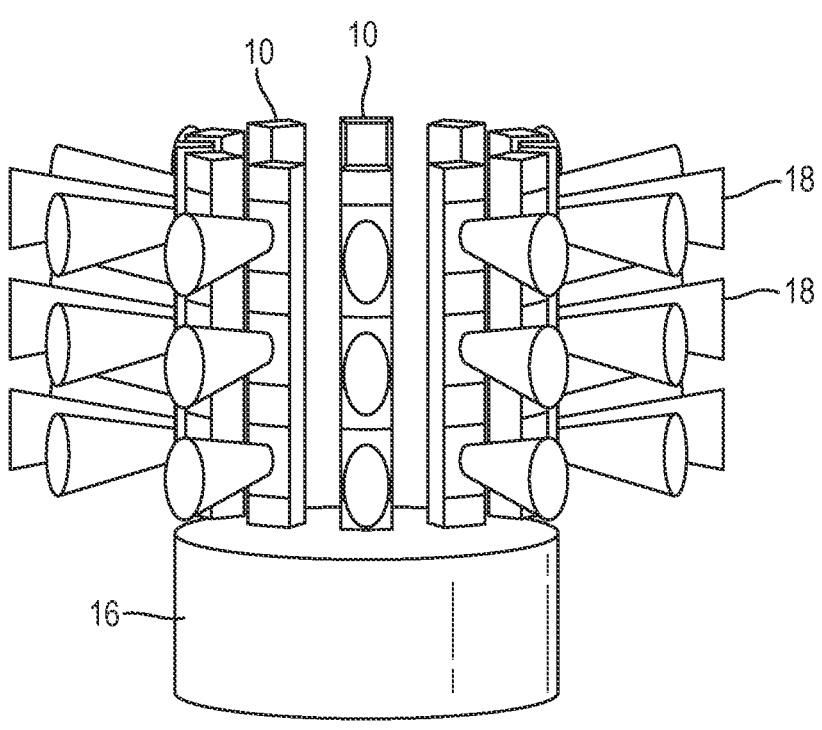
FIG. 1 is a schematic perspective view of an antenna system according to the prior art.
FIG. 2 is a schematic plan view of a microstrip patch antenna array.

Directional descriptors such as upper, lower, left, right, clockwise, anti-clockwise, front, rear and other similar adjectives are used for clarity and to refer to the orientation of the invention as illustrated in the drawings. However, it will be clear to a person skilled in the art that the invention may not always be oriented as illustrated when in use, and the invention is not intended to be limited in this regard.

Figure 5:
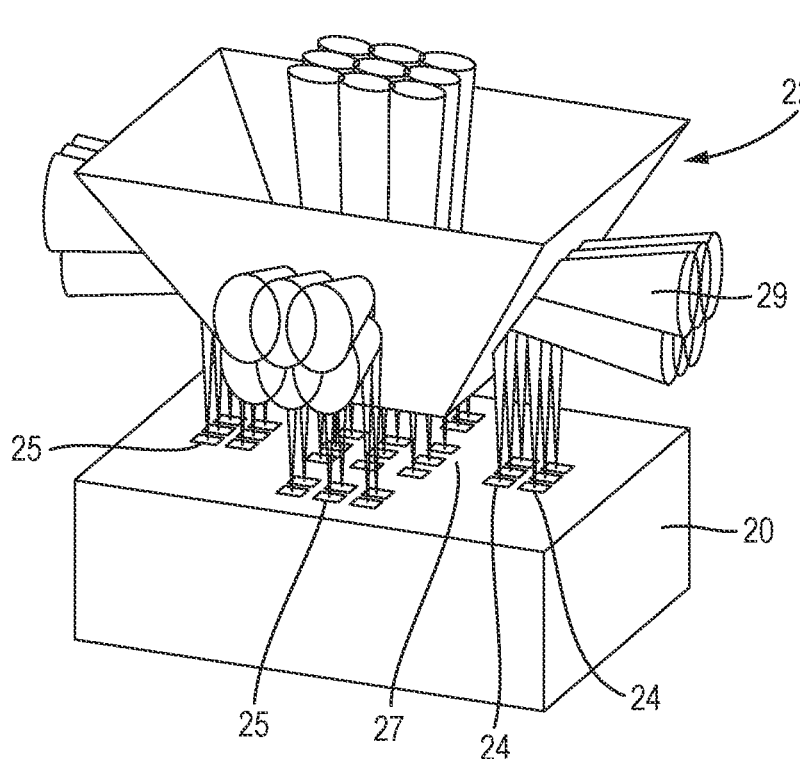
FIG. 5 is a schematic perspective view of an antenna according to a first exemplary embodiment of the present invention.

Referring to FIG. 5 of the drawings, an antenna according to an exemplary embodiment of the present invention is illustrated schematically. The illustrated antenna is designed and constructed for receiving and transmitting (or broadcasting) radio frequency (RF) wave signals in a communications, sensing or imaging system. In a very specific embodiment, this type of antenna is particularly suited to a radar sensing or imaging system, such as an automotive radar system, but the present invention is not intended to be limited in this regard.

The antenna illustrated in FIG. 5 of the drawings comprises a base unit 20 and a reflector unit 22. The base unit 20 comprises a receptacle or box that may have a flat-bottomed surface, to enable it to be mounted or otherwise secured on a planar surface. However, alternative means and configurations are envisaged for enabling the base unit 20 to be mounted in situ for use, and the present invention is not intended to be limited in this regard; nor is it intended to be limited in terms of its shape (or, indeed, its size), other than the fact that it needs to be suitably shaped and sized to house the RF feed electronics (and any associated drive circuitry) required to feed and/or drive the individual antenna elements 24.

The reflector unit 22 comprises a truncated pyramidal unit having a substantially square or rectangular lateral cross-section and mounted above, and spaced-apart from an outer surface of the base unit 20. The reflector unit 22 comprises four outer planar reflective surfaces, each reflective surface extending at an acute angle (preferably substantially 45°) relative to the outer surface of the base unit 20 immediately beneath it.

A plurality of transducer arrays 25, each comprising a plurality of individual (active) antenna elements 24, is provided in or on the 'upper' surface of the base unit 20 (according to the orientation of the system illustrated in FIG. 5). Whilst not absolutely essential, for many applications, it is advantageous for the antenna elements 24 to be low profile or planar antenna elements, which are particularly suited to microwave frequency applications (>100 MHz). A patch antenna is an antenna formed by etching a patch of conductive material on a dielectric substrate. The dielectric substrate is mounted on a ground plane which supports the structure. Thus, the entire 'upper' wall of the base unit 20 may comprise a ground plane that supports a dielectric substrate on which is provided arrays 2 of antenna elements 24. The ground plane, dielectric substrate and antenna elements 24 may be formed using a microstrip technique by fabricating on a printed circuit board (PCB), as will be well known to a person skilled in the art.

Each planar reflective outer surface of the pyramidal reflector unit 22 has associated therewith a respective transducer array 25 such that each reflective surface extends at an acute angle over its respective transducer array 25. In alternative embodiments, each transducer array may be provided on a separate PCB, but it is preferred to provide the transducer arrays 25 on a single PCB as it is more cost effective and minimises the size of the base unit 22 and, therefore, the overall size of the antenna system. Another transducer array 25 may be provided generally centrally on the base unit 20, in line with the longitudinal axis of the reflector unit 22.

Excitation of the antenna elements 24 is provided through feed lines (not shown) connected to the patches. Such feed lines are also, typically, photo-etched on the surface of the substrate, which is typically a thick piece of dielectric material having a dielectric constant in the range 2.2 to 12 to provide good antenna performance. The antenna elements 24 can be excited by a microstrip feed or a coaxial feed, as required or permitted by the application, and the present invention is not necessarily intended to be limited in this regard. However, it will be apparent that any or all of the feed and driver circuitry and cabling can be housed and accommodated in the base unit 20, close to the antenna elements 24 and any power supply required to operate the antenna.

The antenna elements 24 of each transducer array 25 are arranged on the 'upper' surface of the base unit 20 in spaced apart relation and in rows. In the embodiment illustrated schematically in FIG. 5, each transducer array 25 associated with a respective outer reflective surface of the reflector unit 22, and located adjacent thereto, comprises two rows of three antenna elements 24, and the central transducer array comprises three rows of three antenna elements, but the present invention is not intended to be limited in this regard. Essentially, the antenna elements 24 of each transducer array 25 together form a planar array geometry, which is a concept well known in the field, and the manner of design of such geometries, depending on performance (and other) metrics to be achieved, is well documented.

In an exemplary embodiment, for an antenna system required to receive and transmit wave signals, each transducer array may comprise both transmitting and receiving antenna elements. In an exemplary embodiment, the antenna elements of an array may be arranged in alternating rows of transmitting and receiving elements, although other configurations are envisaged. The rows of the transducer array may be offset or 'staggered' in a lateral direction relative to each other, such that the antenna elements of a first row of a transducer array could be offset (laterally) from the antenna elements of an adjacent row (i.e. the antenna elements of a first row are located adjacent the spaces between antenna elements of an adjacent row of the array), which facilitates interferometry to improve resolution.

As stated above, the reflector unit 22 of the antenna system illustrated in FIG. 5 of the drawings comprises, in this specific embodiment of the invention, a truncated pyramidal structure mounted 'above' the base unit 20 with the 'upper' surface of the base unit 20 facing the pyramidal structure and a transducer array 25 located adjacent to (but spaced apart from) each of the four reflective panels forming the reflector unit 22. The outer reflective surface of each of those panels extends at an acute angle (preferably substantially) 45° relative to the plane defined by the respective transducer array 25. Another transducer array 27 is located generally centrally, in line with a nominal vertical axis defined by the longitudinal axis of the pyramidal reflector unit 22.

The nature of the outer reflective surfaces of the reflector unit 22 will, to a large extent at least, be dependent on the application and the nature of the wave signals to be received/transmitted by the antenna. In this specific embodiment, in which electromagnetic waves at radio or microwave frequencies are required to be accommodated, the outer reflective surfaces of the reflector unit 22 may be formed of metal, such as aluminium, or other conducting material, as will be evident to a person skilled in the art. In some exemplary embodiments, the outer reflective surfaces of the reflector unit 22 could be formed of metamaterials, which would act to improve the (angular) resolution of wave signals transmitted and received. The panels forming the generally pyramidal reflector unit 22 need not be planar, but could instead be slightly (outwardly) concave, which would also improve the angular resolution of transmitted/received signals.

Radio or microwave radiation 29 incident on each outer reflective surface of the reflector unit 22 is reflected (through 90°) onto the antenna elements 24 of the respective associated transducer array 25 adjacent to it. Signals incident at a reflective surface at a first 'height' on the reflector unit will be reflected onto the antenna elements of a first row of the associated transducer array 25, signals incident at a second height will be reflected onto the antenna elements 24 of a second row of the associated transducer array 25, and so on. In reality, of course, beams will overlap on the transducer arrays such that at least portions thereof may also be received by antenna elements in adjacent rows and processed accordingly, leading to a high-resolution output.

The angle of the reflective panels of the reflector unit relative to the plane of the transducer arrays is, by design, intended to reflect signals incident thereon through 90° as this enables all of the electronics in the antenna system to be concentrated onto one PCB. This, in turn, is advantageous in terms of significant cost savings (e.g. manufacturing costs, assembly time, hardware, etc).

It will be appreciated that, with the antenna system of FIG. 5, 360° coverage can be achieved, using the pyramidal reflector unit 22, planar antenna array geometry and appropriate drive and processing hardware and software. Hemispherical coverage can be provided using the central transducer array to cover reception from the zenith and adjacent regions.

The use of weighting functions can improve sidelobes and scan angles. In all previous novel configurations, virtual array techniques are applicable and also random compressed array techniques can be used to allow reconstruction of a full array response from significantly fewer sensors. Both of these techniques will be familiar to a person skilled in the art.

Applications for the antenna system of FIG. 5 are varied and include, but are not limited to forklift trucks operating in warehouses that need situational awareness data from the surroundings and also the roof, VSAT receiver antennas for marine vessels (in which case, just an appropriate one or more walls of the reflector unit 22 can be used with a wide base).

Further examples of potential use cases for the hemispherical antenna system of FIG. 5 include:

Installation on the walls or ceiling of a room to enable people-counting applications for room-occupancy analytics.

Installation inside the cabin of a vehicle to enable in-cabin monitoring of passengers for occupancy, passenger health, child- and pet-monitoring.

On industrial trucks and robots for 360-degree situational awareness and height or headroom detection in a warehouse.

If both the top and bottom sides of the RF box 20 (in the embodiment illustrated in FIG. 5) contain printed antennas, then full spherical coverage can be achieved using two such hemispherical antenna systems stacked in a convenient low-cost arrangement.

Figure 6:
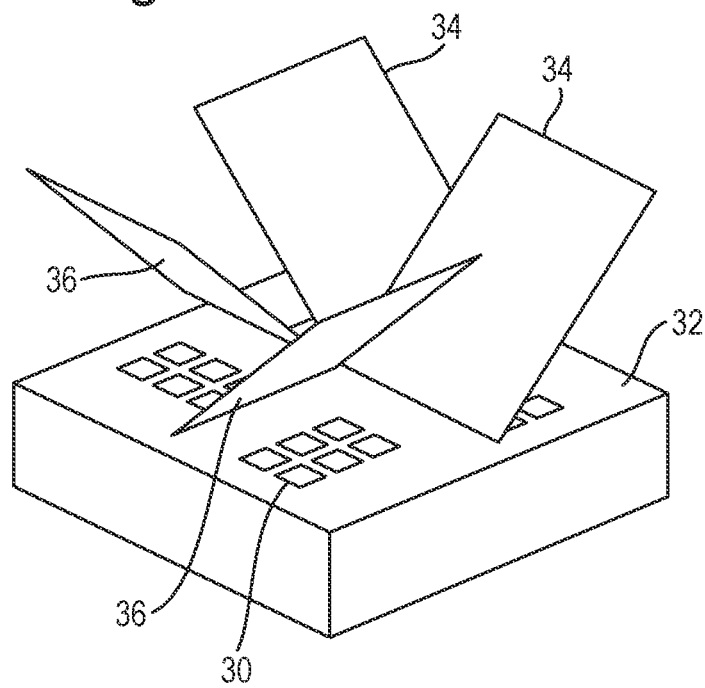
FIG. 6 is a schematic perspective view of an antenna according to a second exemplary embodiment of the present invention.

Referring now to FIG. 6 of the drawings, in an alternative exemplary embodiment, an antenna system comprises (up to) four separate reflector panels 30. A transducer array 32 is provided at each corner of the base unit 34, each one associated with a separate respective reflector panel 30. Each reflector panel comprises a generally rectangular, planar panel having an 'outer' reflective surface 36. In an exemplary embodiment, the reflective panels may be formed of a conductive material such as aluminium. However, it is envisaged that, to improve angular resolution, the outer surface 36 of the panels 30 may be formed of metamaterials. Furthermore, the panels need not strictly be planar and, in fact, in order to improve angular resolution of the received signals, they could be outwardly concave to concentrate the received signals onto the respective transducer array. This could also mean that smaller transducer arrays could be used, which would further reduce size and cost.

Once again, each reflective panel is mounted on the base unit 34 such that the outer reflective surface 36 extends at an acute angle (preferably 45° if the panel 30 is planar) relative to the plane of the respective transducer array 32. As a result, signals received onto the outer reflective surface 36 are reflected through substantially 90°, onto the respective transducer array 32, and signals emitted from antenna elements of the transducer array are incident on the outer reflective surface of the immediately adjacent reflective panel 30 and are reflected (again through substantially 90°) outwardly. In FIG. 6, these antenna beams are not shown.

In another exemplary embodiment, another transducer array could be provided generally centrally to receive and send wave signals in the zenith and adjacent regions. In this case, an inner corner of each reflective panel could be truncated, to create a generally central path for such signals and space to place a transducer array on the base unit 32 in the centre of the reflector panel arrangement.

The arrangement of FIG. 6 can achieve a similar omnidirectional coverage as the pyramidal reflector unit of FIG. 5. However, it can save around half the space, thus enabling a much more compact antenna system. In some embodiments, beam coverage may only be required in selected sectors or quadrants of the 360° volume around the antenna system, in which case, there need not be all four reflector units 34 and four associated planar transducer arrays 32, but instead only one, two or more thereof could be utilised to provide 90°, 180° or 270° coverage respectively, thereby further reducing the size, weight and cost of the antenna system.

The arrangement of FIG. 6 can be made even more compact in the horizontal plane by using printed antennas on both sides of the RF box 32 and using two of the reflectors 36 on the top (for 180° coverage) and the remaining two on the bottom (for the remaining 180° degrees) to cover the full 360°. The height of this arrangement is twice that of the arrangement illustrated in FIG. 6. This arrangement also supports printed antennas in the middle (not shown) on one or both sides, with the reflectors 36 truncated to leave an opening for the middle antennas to be able to cover the zenith and nadir directions and adjacent regions, thus leading to another arrangement of full spherical coverage.

Figures 7, 8:
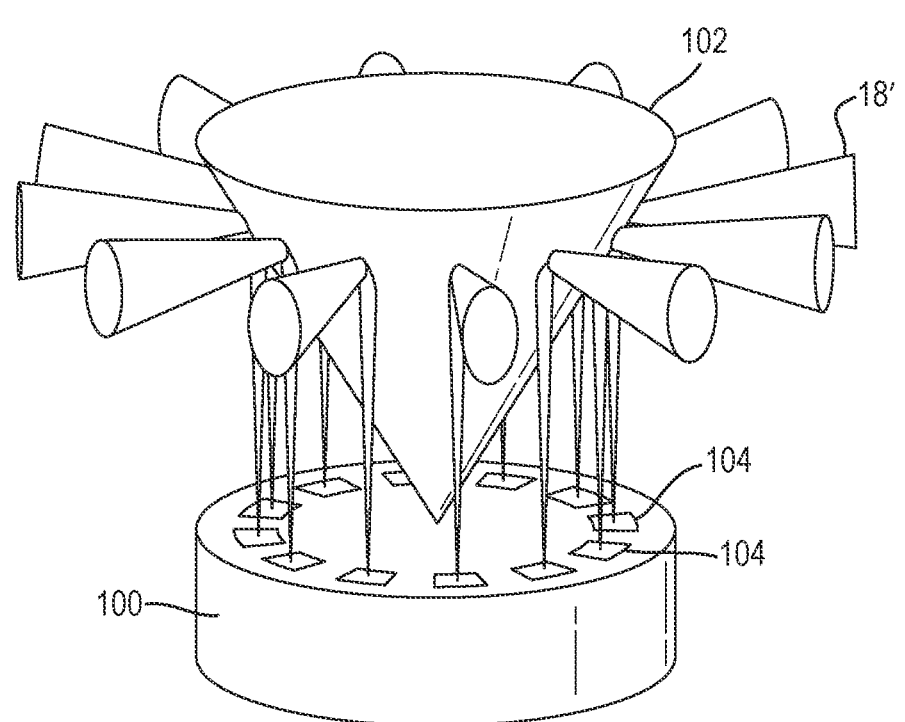
FIG. 7 is a schematic perspective view of an antenna according to a third exemplary embodiment of the present invention.
FIG. 8 is a schematic simplified perspective view of the antenna of FIG. 7.

Referring to FIG. 7 of the drawings, an antenna according to yet another exemplary embodiment of the invention is illustrated schematically. The illustrated antenna is, once again, designed and constructed for receiving and transmitting (or broadcasting) radio frequency (RF) wave signals in a communications, sensing or imaging system. In a very specific embodiment, this type of antenna is once again particularly suited to a radar sensing or imaging system, such as an automotive radar system, but the present invention is in no way intended to be limited in this regard.

The antenna illustrated in FIG. 7 of the drawings comprises a base unit 100 and a reflector unit 102. The base unit 100 comprises a receptacle or box that may have a flat-bottomed surface, to enable it to be mounted or otherwise secured on a planar surface. However, alternative means and configurations are envisaged for enabling the base unit 100 to be mounted in situ for use, and the present invention is not intended to be limited in this regard; nor is it intended to be limited in terms of its shape (or, indeed, its size), other than in the fact that it needs to be suitable shaped and sized to house the RF feed electronics (and any associated drive circuitry) required to feed and/or drive the individual antenna elements 104.

As in the previous embodiments, a plurality of such individual (active) antenna elements 104 is provided on or at the 'upper' surface of the base unit (according to the orientation of the system illustrated in FIG. 7). Whilst not absolutely essential, for many applications, it is advantageous for the antenna elements 104 to be low profile or planar antenna elements such as patch antennas, which are particularly suited to microwave frequency (>100 MHz). A patch antenna is an antenna formed by etching a patch of conductive material on a dielectric substrate. The dielectric substrate is mounted on a ground plane which supports the structure. The entire 'upper' wall of the base unit 100 may comprise a ground plane that supports a dielectric substrate on which is provided a plurality (or 'array') of antenna elements 104. The ground plane, dielectric substrate and antenna elements 104 may be formed using a microstrip technique by fabricating on a printed circuit board (PCB), as will be well known to a person skilled in the art.

Excitation of the antenna elements is provided through feed lines (not shown) connected to the patches. Such feed lines are also, typically, photo-etched on the surface of the substrate, which is typically a thick piece of dielectric material having a dielectric constant in the range 2.2 to 12 to provide good antenna performance. The antenna elements 104 can, once again, be excited by microstrip feed or a coaxial feed, as required or permitted by the application, and the present invention is not necessarily intended to be limited in this regard. However, it will be apparent that any and all of the feed and driver circuitry and cabling can be housed and accommodated in the base unit 100, close to the antenna elements 104 and any power supply required to operate the antenna.

The antenna elements 104 are arranged on the 'upper' surface of the base unit 100 in spaced-apart relation and in a number of (in this specific case, three) concentric circles or rings. A nominal vertical axis, referred to hereinafter, can be defined through the concentric point of the patch antenna rings. The patch antenna elements in each ring will typically be of the same size and configuration, although the size and configuration thereof could, in theory at least, vary between the rings (e.g. from the smallest ring, the antenna elements could get progressively larger in each ring). However, this is a design issue that will be dependent on the specific application and characteristics to be achieved, as will be apparent to a person skilled in the art. Essentially, however, the antenna elements 104 together form a planar array geometry, as described above in relation to the embodiments of FIGS. 5 and 6, which is a concept well known in the field, and the manner of design of such geometries, depending on performance (and other) metrics to be achieved, is well documented. Of course, the planar array geometry need not necessarily be symmetrical (depending on the shape and configuration of the reflector unit(s) and/or the beams required to be formed), nor do the antenna elements necessarily need to extend all of the way around the central point defining the above-mentioned vertical axis. In some embodiments, beam formation and/or reception may be required in a specific sector or quadrant of the surrounding environment, and all signals therefrom may be concentrated onto a set of antenna elements clustered in just a portion of the circumference around the vertical axis.

The reflector unit 102 of the antenna illustrated in FIG. 7 of the drawings comprises, in this specific embodiment, a conical structure mounted 'above' the base unit 100, with the 'upper' surface of the base unit 100 facing the conical structure. The apex of the conical structure is nearest the base unit 100 and is located at a point vertically above the centre of the circles of antenna elements 104, on the above-mentioned vertical axis. Thus, the above-defined nominal vertical axis extends upward from the centre of the circles of antenna elements 104 and through the apex of the conical structure, such that (in this embodiment) the body of the conical structure extends around the vertical axis which defines the centre, and the conical structure is thus symmetrical about the vertical axis.

The conical structure has an outer reflective surface, the nature of which will, to a large extent at least, be dependent on the application and the nature of the wave signals to be received/transmitted by the antenna. In this specific exemplary embodiment, in which electromagnetic waves at radio or microwave frequencies are required to be accommodated, the outer reflective surface may be formed of metal or other conductive material, or even metamaterials, as will be apparent to a person skilled in the art. Radio or microwave radiation incident on the reflector unit 102 is reflected with an angle of incidence equal to that of the incident ray and, by careful selection of the angle (e.g. substantially 45°) of the outer wall of the conical structure (relative to the plane of the transducer array(s)), radiation incident at various heights thereon can be caused to be reflected through substantially 90° onto the antenna elements 104 in or on the 'upper' surface of the base unit 100. If, then, the locations of the antenna elements (i.e. the radii of the circles or rings in which they are arranged) are carefully designed to correspond, the signals incident on the conical structure and reflected through substantially 90° 'downward', will be received at the patch elements below. Equally, signals transmitted vertically upward from the patch antenna elements 103 will be incident on, and reflected through substantially 90° horizontally outward by, the outer reflector unit 102. In an exemplary embodiment, one or more of the circles or rings of antenna elements 104 could be transmitting and the other one or more rings of antenna elements 104 could be receiving signals.

Figure 4:
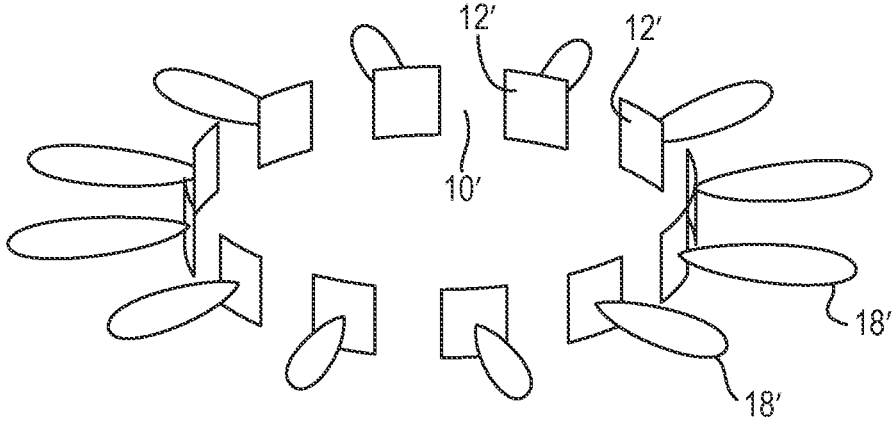
FIG. 4 is a schematic perspective diagram illustrating the principal of a conformal cylindrical antenna array according to the prior art.

Referring to FIG. 8 of the drawings, a simplified illustration of the arrangement of FIG. 7 is provided, showing a single set of beams 18 incident at the same height all the way around the conical reflector unit 102, and reflected onto a respective one antenna element in a single ring of antenna elements. This 'embodiment' of the invention is, in essence, equivalent or analogous to the conformal cylindrical array illustrated schematically in FIG. 4 of the drawings, but the hardware of the implementation is much simplified by adopting the concept of the present invention.

In reality, of course (and as with a 2D planar array), in a system such as that illustrated in FIG. 7 of the drawings (an those of FIGS. 5 and 6), beams will overlap on the or each antenna array such that at least portions thereof may also be received by adjacent antenna panels and processed accordingly to produce a high-resolution output.

Figure 3:
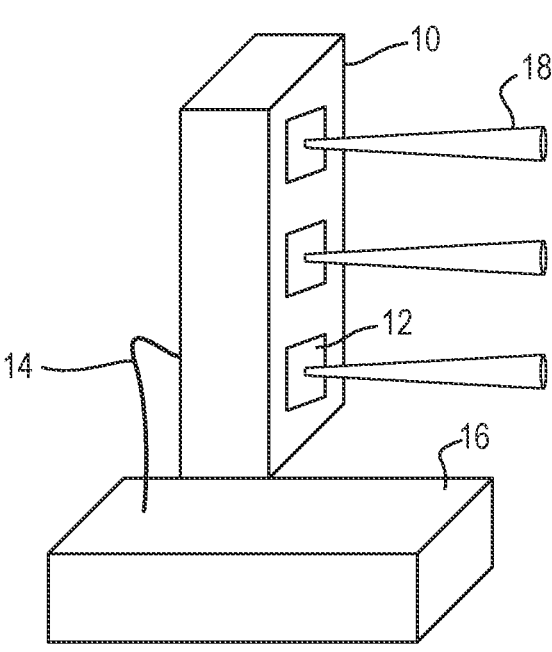
FIG. 3 is a schematic perspective view of a single antenna panel and associated base unit of an antenna system according to the prior art.
Figure 9:
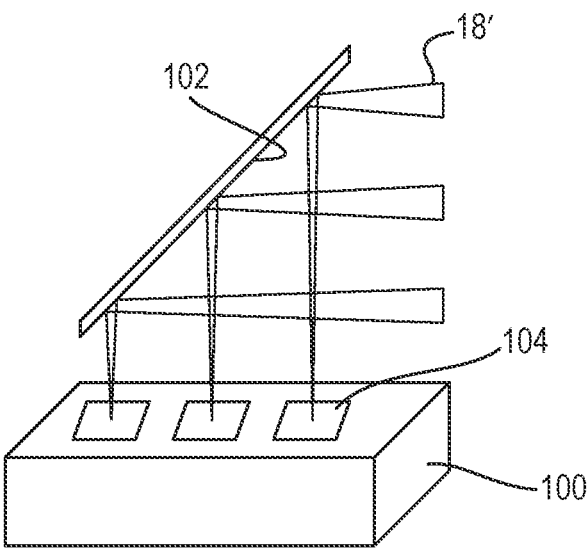
FIG. 9 is a schematic close up view of the principal of operation of the antenna of FIG. 7.

Thus, it will be appreciated that 360° coverage can be achieved with the pyramidal reflector of FIG. 5, the offset reflector panels of FIG. 6 or the conical reflector of FIG. 7, together with planar antenna array geometry and appropriate drive and processing hardware and software. Indeed, referring to FIG. 9 of the drawings, the simplified construction of FIG. 3 can, in essence, be replicated around a 360° volume, wherein each radial set of antenna elements (one from each circle in this specific embodiment) can be considered to be equivalent (or at least analogous) to the three-antenna planar array of FIG. 3, with the elevation coverage being provided by the 'stacked' beams created because of the 'flare angle' of the reflector unit 102. Accordingly, by using the pyramidal reflector of FIG. 5, the offset reflector panels of FIG. 6 or the conical reflector of FIG. 7, the planar array functionality can be replicated around a 360° volume without the need for any mechanical scanning or the provision of multiple planar arrays as illustrated in FIG. 1. The reflector unit produces beams 18' in respect of a full 360° volume surrounding it (or selected quadrants or sectors thereof), but these beams 18' are generated (or processed) in a similar manner as with a 2D planar array geometry. As a result, only a single "panel", i.e. the base unit, is required, and there is no need for the antenna panels (10—FIG. 1), and the associated cabling/circuitry is eliminated. Further, changing the height of the antenna is simplified, because only the reflector unit(s) need to be moved (or changed). The drive and signal processing hardware can be left in situ and readily adapted or tuned without having to move the base unit.

Figure 10:
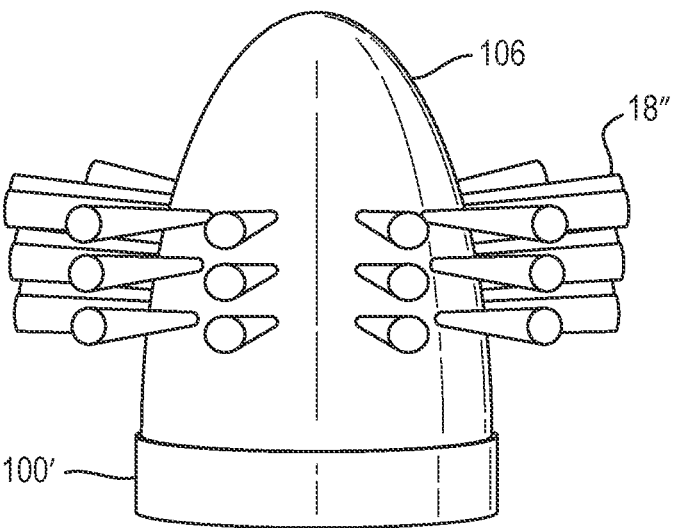
FIG. 10 is a schematic perspective view of a holographic radar system according to an exemplary embodiment of the present invention.

Referring to FIG. 10 of the drawings, there is illustrated schematically a holographic (non-scanning) radar system according to an exemplary embodiment of the invention. In the illustrated embodiment, the surface of the base unit carrying the antenna elements and the pyramidal reflector unit of FIG. 5, the offset reflector panels of FIG. 6 or conical reflector unit of FIG. 7 (not seen) are covered by a radome structure 106. The radome structure 106 is an elongate dome providing a weather-proof protective cover for an antenna such as that illustrated in FIG. 5, 6 or 7 of the drawings, for example. The dome 106 is formed of a material that minimally attenuates the electromagnetic signals (i.e. radar signals) being captured or transmitted by the antenna. As will be well known to those skilled in the art, a radome is typically made of a fibre-reinforced polymer material and it can be of a single wall, sandwich or space frame structure. The present invention is not intended to be limited in this regard, and the material selected for a protective cover for any of the embodiments of the invention will be dependent on the application for which the transducer/antenna is required for use. For example, referring to FIG. 11 of the drawings, in a roof mounted holographic radar system for a driverless vehicle 108, the weight of the structure will be important, and a sandwich structure having a honeycomb or foam core may be selected. However, performance and optimum resolution will be critical, so the composite material and structure selected for the radome will need to be optimise for dielectric performance, as well as mechanical properties and environmental resilience. Many different appropriate materials are available for this purpose, as will be well known to a person skilled in the art, and the present invention is not intended to be limited in this regard.

It will be appreciated that the present invention is not necessarily intended to be limited with regard to the cross-section of the 'conical' reflector 102. For a wide variety of applications, it is expected or envisaged that the reflector 102 will be symmetrical/isotropic, even if the arrangement and configuration of the transducer/antenna elements 104 is not symmetrical. This would apply to the arrangement of FIGS. 5 and 6, described above, as well as that described with reference to FIG. 7. For some applications, the cross-section of the reflector unit (or the arrangement of separate reflector plates) could be non-isotropic. For example, a conical (or truncated conical) reflector with an elliptical cross-section could be utilised to produce different beam profiles along the directions of the major and minor axes of the elliptical cross-section, as may be required for some applications. As previously stated, the outward facing reflective surfaces may be made concave to improve angular resolution of transmitted/received signals.

The antenna beams produced by embodiments of the invention can be transmitted in various configurations including simultaneous transmission, staggered transmission, sequential transmission, lobe switching, etc., as will be familiar to a person skilled in the art. In an exemplary embodiment, a 'beam-switching' alternative to beam-scanning can be achieved to scan the full 360° by simply turning on the transmitters in a sequential manner. As previously stated, the antenna elements do not need to be symmetrical all the way around the base unit. Thus, in some applications, it may be desired to have better elevation coverage with a larger number of beams in certain azimuth directions, with less or no elevation coverage in other directions.

Similarly, for a wide variety of applications, the conic-sector or pyramidal reflector unit is envisaged to be symmetrical/isotropic. Even if (as mentioned above) the array of antenna elements is not symmetrical. However, it will be apparent to a person skilled in the art that the reflector unit (or arrangement of reflector plates) may be non-isotropic. For example, the reflector unit may have an elliptical (to give different beam profiles along the directions of the major and minor axes of the elliptical cross-section for some applications), rectangular or polygonal cross-section, or (as in the case of the embodiment illustrated and described with reference to FIG. 6) only one or more of the reflector plates may be provided, if only one or more quadrants of the environment are required to be monitored.

Furthermore, the received waves can be processed by the receiving antenna array in various ways, including the amplitude and phase monopulse method, compressed sensing and other beamsteering methods which will be familiar to a person skilled in the art.

In an exemplary embodiment, the radial sets of antennas (in the example illustrated and described with reference to FIG. 7) or the arrays of antennas (in the embodiments illustrated and described with reference to FIGS. 5 and 6) can alternate between transmit and receive beams. In the embodiment illustrated in FIG. 7, there are three antennas in each radial set. These could alternate: receive, transmit, receive. This would produce two receive beams around each transmit beam, and both monopulse and array-based processing can be performed to generate a high-resolution image of the 3D scene around the antenna. In the examples illustrated and described with reference to FIGS. 5 and 6 of the drawings, similarly, each column of antennas could have alternating receive, transmit, receive to provide two receive beams around each transmit beam.

If multiple panels are used for RF reception of a 3D space (as in the prior art described with reference to FIG. 1 of the drawings), there is an extra problem of gathering all the data and routing it to a centralised data processor. This situation occurs when multiple panels are used to form, for example, a 360° holographic radar and leads to scheduling and data transfer problems. Embodiments of the present invention offer a solution to these problems by eliminating the need for external data routing cables and data scheduling and collection hardware by integrating all electronic components into a single base unit.

It will be evident to a person skilled in the art that various feed-network architectures (e.g. series feed, corporate feed, etc.) can be used to feed the antenna elements in the above-described (and other) embodiments of the invention. Also, many transmission-line technologies can be used to fabricate the printed circuit board (PCB) containing the antenna elements, such fabrication technologies including, for example, the above-mentioned microstrip, stripline, coplanar waveguide, substrate integrated waveguide, etc.

In general terms, embodiments of the invention are analogous to a conformal cylindrical array having curved antenna elements distributed on a cylinder in a 3D space. Thus, the signal processing in relation to the signals received on the planar array of antenna elements may be performed in a similar manner to that used in conformal cylinder array systems, at least for some applications. However, the reflector shape and the arrangement of the planar antenna elements will influence the overall beam patterns, which can be optimised for a given application, and the resultant signal processing required can be adapted accordingly.

Furthermore, various substrate materials can be used in the design of the PCBs. Circuit technologies other than PCB can be used to make a system according to the invention, including RF modules and monolithic microwave integrated circuits (MMICs). Also, various beam shapes can be constructed through the reflector(s)/feed combination. In addition, the main antenna elements can be placed on a nonplanar surface, having curvature for example, that can give a combined effect, with the shape and configuration of the reflector(s), which may be advantageous for some applications. Still further, the system is, in principle, frequency and polarisation agnostic.

The reflector(s) can be made using various types of material depending on the application for which it/they are intended. Metamaterials could be used to achieve certain desirable properties, such as an improvement in angular resolution. The reflector(s) do not necessarily need to have a continuous smooth surface, and could have cuts or breaks therein, depending on the application.

It is envisaged that the arrangements described above can be adapted and used as a low-cost and much-simplified alternative antenna/transducer in a wide variety of engineering applications. A non-exhaustive list of possible applications is provided below:

Fixed Radar installations for a wide variety of volumetric coverage applications, including positioning, surveillance, tracking, traffic telemetry, etc. An example is Drone Detection Radar that needs to search, detect, track and classify drones in a certain volume of space. Another example is a coastal surveillance Radar mounted on seashores for the tracking of marine vessels. Embodiments of the invention can also be used to replace traditional, mechanically scanned Radar and remote sensing systems with the nonscanning technology in this invention, leading to further electromechanical simplification by eliminating the motors and drive circuits.

Suitably-mounted Radar sensor for the navigation of autonomous vehicles including driverless cars, trucks, land movers, mining machines, military autonomous vehicles, forklift trucks, etc. One such embodiment is illustrated schematically in FIG. 11 of the drawings.

Figure 11:
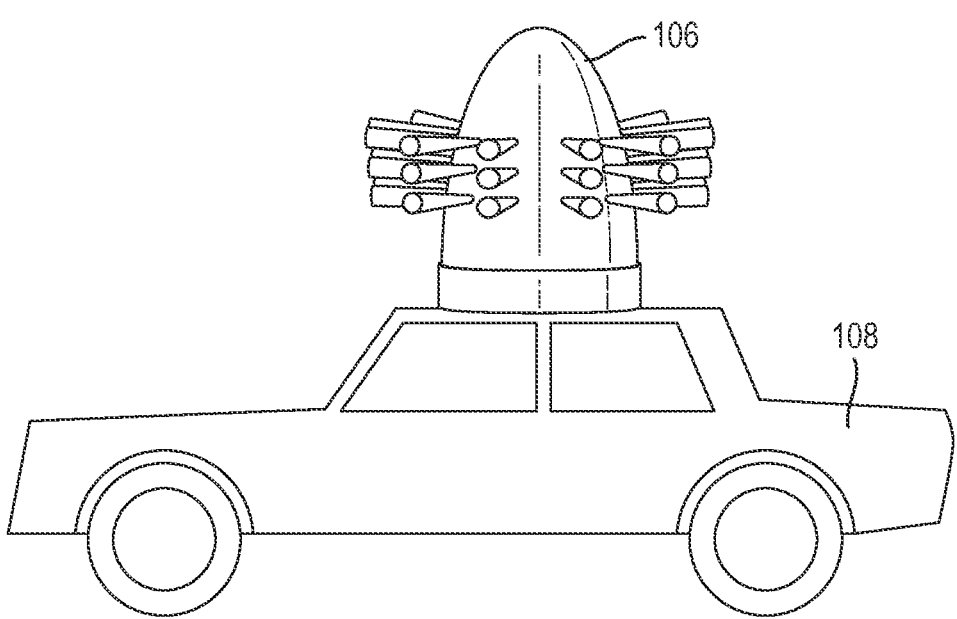
FIG. 11 is a schematic illustration of the system of FIG. 10, in use.

Also referring to FIG. 11, the platform motion can be used to enhance the definition in the scene using various techniques including Doppler beam sharpening.

Vehicle-to-vehicle (V2V) and vehicle-to-everything (V2X) communications antenna for intelligent transport.

Broadcast antennas for mobile base stations and wireless communication.

The embodiments depicted in FIGS. 5 and 6, in particular, may have applications including military Radar. The reflective plates (and associated transducer arrays) can be configured to enable any number of antenna beams to be transmitted or received.

Omni-directional sensing systems for indoor positioning applications like people-counting and motion-detection in industrial and non-industrial environments.

Omni-directional broadband RF energy harvesting devices for wireless electricity generation. The concept can be extended to gathering solar and laser energy.

An omni-directional lighting device with light sources as the transducer elements. Embodiments of the invention can also be used as a new generation of satellite-based systems for the broadcast coverage of defined volumes of space. An embodiment of the invention also lends itself to a new generation of foldable antennas for space applications.

Embodiments of the invention can generally be used to replace a wide range of "conformal" antenna configurations with a simplified planar implementation.

It will be apparent to a person skilled in the art that, in addition to the full 360 degree coverage, embodiments of the invention can be sued for an azimuthal volume of less than 360° as well. Thus, an exemplary embodiment of the invention can be sued to cover a sector or quadrant of, for example, 90° or 180° of the volume only. This can happen in a case where multiple sensors based on embodiments of invention are used to optimise the coverage area. An example of this is an indoor positions application, where good coverage is desired within a room, but no coverage is required for the directions facing the wall. In another embodiment, a Radar Traffic Telemetry system installed on the roadside will need to cover the actual roads for traffic telemetry but may not need to cover the off-road region.

Whilst embodiments of the present invention have been described above in relation to radio/microwave frequency (radar) antenna, it is also envisaged that the invention could be applicable to other, adjacent fields of technology that utilise pressure or mechanical ('wireless') wave signals, such as (but not necessarily limited to) optical systems including (as transducer elements) cameras, acoustic or microphone array systems, conformal sonar array systems, and 3D laser array and LiDAR systems.

In each of the above types of system, aspects of the invention offer a new means of providing a low-cost coverage of either the full 360° around the sensor or an appropriate sector or quadrant thereof. In the respective cases, the reflector(s) can take on many shapes and can be made of various materials suitable for the application. Thus, for the optical and laser systems, the reflective surfaces of the reflector plates of the embodiment of FIG. 5 could be mirrors, or (in the case of the embodiments described with reference to FIGS. 6 and 7 of the drawings, the reflector unit could be a suitable conic-section or pyramidal mirror, for example. For a sonar system, it could, for example, be an ultrasonic reflector. For an acoustic system, it can be an acoustic reflector. For under-water applications it can be a hydrophonic reflector. For some applications, metamaterials can be used to achieve desirable beamforming properties.

The 'transducer elements' can also be suitably chosen for a given application. Thus, for optical applications, the elements can be lenses for example. For acoustic applications, they can be microphone arrays, and for underwater sonar applications they can be hydrophonic or piezoelectric transducers. For laser applications, they would be laser sources.

In an optical system, embodiments of the invention can be used to overcome the traditional trade-off between the larger coverage of panoramic cameras and the high-resolution of focused cameras that may or may not use pan-tilt-zoom (PTZ) mechanism. That is, a new generation of very high-resolution panoramic cameras not requiring a pan/tilt mechanism can be constructed according to an exemplary embodiment of the invention, with diverse applications in various fields including, but not limited to, outdoor surveying of roads and buildings, and security cameras installed indoors and outdoors. An application of this type of camera can, for example, be as an integrated high-resolution camera in a next generation electronic device (handheld or otherwise) for the 3D imaging of a desired scene. This type of device can (optionally) also utilise a foldable reflector configuration for stowage when not in use.

It will be apparent to a person skilled in the art, from the foregoing detailed description, that modifications and variations can be made to the described embodiments without departing from the scope of the invention as defined by the appended claims.

The invention claimed is:

1. A sensing or imaging system comprising an antenna including one or more transducer arrays, and drive and signal processing hardware, said antenna being configured to transmit and/or receive wave signals of substantially the same predetermined frequency or frequency band simultaneously from at least a sector of a 360° volume of the environment around an axis, the antenna comprising a base unit and one or more reflector units, the one or more reflector units being mounted relative to the base unit such that an outer surface of said base unit faces the one or more reflector units, the base unit having, in or on said outer surface thereof, one or more transducer arrays associated with the or each reflector unit, the or each transducer array comprising a plurality of active transducer elements, the one or more reflector units comprising, respectively, one or more reflective plates, the or each reflective plate having an outer reflective surface and being mounted relative to the base unit such that the outer reflective surface thereof extends at an acute angle relative to a portion of the outer surface of said base unit having therein or thereon a transducer array associated therewith, such that, in use, wave signals generated and radiated by said active transducer elements of a transducer array are radiated onto, and reflected outwardly from, a reflective surface of a said reflector unit associated therewith, and said wave signals returned and incident on a reflective surface of a said reflector unit are reflected thereby onto the transducer elements of a said transducer array associated therewith, the or each reflective plate being mounted relative to said base unit so as to, in use, reflect signals incident thereon through substantially 90° from or onto the transducer array associated therewith, and the or each transducer array comprising rows of transducer element arranged such that each row of transducer elements receives wave signals from, or transmits wave signals to, the outer reflective surface of a respective reflective plate at a different respective height thereon, the or each transducer array comprising a plurality of transmitters that only transmit wave signals of a predetermined frequency or frequency band to the outer reflective surface of a respective reflective plate, and a plurality of receivers that only receive wave signals of substantially the same predetermined frequency or frequency band from the outer reflective surface of a respective reflective plate.

2. An antenna according to claim 1, wherein said reflective plates are substantially planar.

3. An antenna according to claim 1, wherein each transducer array comprises a matrix having rows of transducer elements, wherein each alternate row of transducer elements comprises either transmitting or receiving transducer elements.

4. An antenna according to claim 1, wherein the or each reflective plate is mounted such that its outer reflective surface extends at substantially 45° to the plane of the respective transducer array associated therewith.

5. A transducer according to claim 1, wherein said one or more reflective plates are outwardly concave.

6. A transducer according to claim 1, comprising a pyramidal or truncated pyramidal reflector unit, comprising four reflective plates, each said reflective plate of said reflector unit having a reflective outer wall that extends at an acute angle relative to the outer surface of the base unit, the transducer further comprising, in or on said outer surface of said base unit, a plurality of transducer arrays, each transducer array comprising active transducer elements arranged in sets or blocks and being located adjacent the reflective outer surface of a respective reflective plate of the reflector unit.

7. A transducer according to claim 1, comprising a transducer array located generally centrally on the base unit relative to said reflector unit(s) for receiving and transmitting signals to and from the zenith and adjacent regions of the environment around the transducer.

8. A transducer configured to transmit and/or receive wave signals simultaneously from at least a sector of a 360° volume of the environment around an axis, the transducer comprising a base unit and one or more reflector units, the one or more reflector units being mounted relative to the base unit such that an outer surface of said base unit faces the one or more reflector units, the base unit having, in or on said outer surface thereof, one or more transducer arrays associated with the or each reflector unit, the or each transducer array comprising a plurality of active transducer elements, the one or more reflector units comprising, respectively, one or more reflective plates, the or each reflective plate having an outer reflective surface and being mounted relative to the base unit such that the outer reflective surface thereof extends at an acute angle relative to a portion of the outer surface of said base unit having therein or thereon a transducer array associated therewith, such that, in use, wave signals generated and radiated by said active transducer elements of a transducer array are radiated onto, and reflected outwardly from, a reflective surface of a said reflector unit associated therewith, and wave signals incident on a reflective surface of a said reflector unit are reflected thereby onto the transducer elements of a said transducer array associated therewith.

9. A transducer according to claim 8, comprising a three-dimensional reflector unit mounted relative to, and spaced-apart along said axis from, said base unit, said reflector unit that increases in cross-sectional width or diameter in a direction away from said outer surface of said base unit.

10. An antenna according to claim 1, wherein the transducer elements of the or each transducer array are provided on a planar surface.

11. A transducer according to claim 9, wherein the outer reflective surface is provided all of the way around the reflector unit, along at least a portion of its height, or wherein the outer reflective surface is provided around a portion of the reflector unit.

12. A transducer according to claim 9, wherein the reflector unit comprises a generally conic-section structure, with the smallest diameter end being located nearest said outer surface of said base unit.

13. A transducer according to claim 9, wherein the plurality of transducer elements provided on or in said outer surface of said base unit are arranged in spaced-apart relation and in a configuration corresponding with the cross-sectional shape of said reflector unit.

14. An antenna according to claim 1, wherein the transducer elements comprise planar transducer elements.

15. An antenna according to claim 1 for transmitting and receiving radio or microwave frequency wave signals, wherein the transducer elements comprise antenna elements configured to either transmit or receive radio or microwave frequency wave signals, and the reflective outer surface of the reflector unit comprises a conductive material.

16. An antenna according to claim 1 further comprising a protective cover enclosing at least said one or more reflector units and said outer surface of said base unit, said protective cover being formed of a material that is substantially transparent to said wave signals.

17. A transducer configured to transmit and/or receive wave signals simultaneously from at least a sector of a 360° volume of the environment around an axis, the transducer comprising a base unit and one or more reflector units, the one or more reflector units being mounted relative to the base unit such that an outer surface of said base unit faces the one or more reflector units, the base unit having, in or on said outer surface thereof, one or more transducer arrays associated with the or each reflector unit, the or each transducer array comprising a plurality of active transducer elements, the one or more reflector units comprising, respectively, one or more reflective plates, the or each reflective plate having an outer reflective surface and being mounted relative to the base unit such that the outer reflective surface thereof extends at an acute angle relative to a portion of the outer surface of said base unit having therein or thereon a transducer array associated therewith, such that, in use, wave signals generated and radiated by said active transducer elements of a transducer array are radiated onto, and reflected outwardly from, a reflective surface of a said reflector unit associated therewith, and wave signals incident on a reflective surface of a said reflector unit are reflected thereby onto the transducer elements of a said transducer array associated therewith, wherein the reflector unit is a conic-section structure and the active transducer elements are arranged in spaced-apart relation and in a plurality of concentric rings, such that each ring of active transducer elements receives wave signals from, or transmit wave signals to, the outer reflective surface of the reflector unit at a different respective height thereon, and a plurality of radial sets of transducer elements is defined.

18. A transducer according to claim 17, wherein said reflector unit is a conical or truncated conical structure.

19. A transducer configured to transmit and/or receive wave signals simultaneously from at least a sector of a 360° volume of the environment around an axis, the transducer comprising a base unit and one or more reflector units, the one or more reflector units being mounted relative to the base unit such that an outer surface of said base unit faces the one or more reflector units, the base unit having, in or on said outer surface thereof, one or more transducer arrays associated with the or each reflector unit, the or each transducer array comprising a plurality of active transducer elements, the one or more reflector units comprising, respectively, one or more reflective plates, the or each reflective plate having an outer reflective surface and being mounted relative to the base unit such that the outer reflective surface thereof extends at an acute angle relative to a portion of the outer surface of said base unit having therein or thereon a transducer array associated therewith, such that, in use, wave signals generated and radiated by said active transducer elements of a transducer array are radiated onto, and reflected outwardly from, a reflective surface of a said reflector unit associated therewith, and wave signals incident on a reflective surface of a said reflector unit are reflected thereby onto the transducer elements of a said transducer array associated therewith, wherein some of the transducer elements of the transducer array are active, and other of the transducer elements of the transducer array are passive.

20. A transducer configured to transmit and/or receive wave signals simultaneously from at least a sector of a 360° volume of the environment around an axis, the transducer comprising a base unit and one or more reflector units, the one or more reflector units being mounted relative to the base unit such that an outer surface of said base unit faces the one or more reflector units, the base unit having, in or on said outer surface thereof, one or more transducer arrays associated with the or each reflector unit, the or each transducer array comprising a plurality of active transducer elements, the one or more reflector units comprising, respectively, one or more reflective plates, the or each reflective plate having an outer reflective surface and being mounted relative to the base unit such that the outer reflective surface thereof extends at an acute angle relative to a portion of the outer surface of said base unit having therein or thereon a transducer array associated therewith, such that, in use, wave signals generated and radiated by said active transducer elements of a transducer array are radiated onto, and reflected outwardly from, a reflective surface of a said reflector unit associated therewith, and wave signals incident on a reflective surface of a said reflector unit are reflected thereby onto the transducer elements of a said transducer array associated therewith, wherein the reflector unit has a non-symmetrical cross-section.

\* \* \* \* \*